(12) United States Patent
Klein

(10) Patent No.: US 10,092,871 B2
(45) Date of Patent: Oct. 9, 2018

(54) ASSEMBLY FOR AN AIR CONDITIONING SYSTEM

(71) Applicant: Mahle Behr GmbH & Co. KG, Stuttgart (DE)

(72) Inventor: Florian Klein, Moettlingen (DE)

(73) Assignee: Mahle Behr GmbH & Co. KG (DE)

( * ) Notice: Subject to any disclaimer, the term of this patent is extended or adjusted under 35 U.S.C. 154(b) by 321 days.

(21) Appl. No.: 14/617,496

(22) Filed: Feb. 9, 2015

(65) Prior Publication Data

US 2015/0224436 A1 Aug. 13, 2015

(30) Foreign Application Priority Data

Feb. 10, 2014 (DE) .................. 10 2014 202 368

(51) Int. Cl.
*B60H 3/00* (2006.01)
*B01D 46/00* (2006.01)
(Continued)

(52) U.S. Cl.
CPC ..... *B01D 46/0027* (2013.01); *B01D 46/0002* (2013.01); *B01D 46/0031* (2013.01);
(Continued)

(58) Field of Classification Search
CPC .... B60H 1/00021; B60H 1/28; B60H 1/3202; B60H 1/3233; F25D 21/14; B01D 19/00; B01D 46/0031; B01D 50/002; B01D 2279/60; F02M 35/024; F02M 35/0201; F02M 35/022; F02M 35/0226; F02M 35/088

USPC ...... 55/515, 434.2, 385.3, 306, 421; 62/285, 62/291; 165/203; 261/30, DIG. 17; 210/315; 96/186, 187, 188, 189; 123/198 E

See application file for complete search history.

(56) References Cited

U.S. PATENT DOCUMENTS 5,230,547 A * 7/1993 Koukal ................ B62D 25/081
296/192
5,908,337 A * 6/1999 Mashiko ............... F02B 61/045
440/88 A (Continued)

FOREIGN PATENT DOCUMENTS

DE 102008007915 A1 8/2009
DE 102010005960 A1 7/2011
(Continued)

OTHER PUBLICATIONS

English Abstract for DE102008007915A1.
(Continued)

*Primary Examiner* — Duane Smith
*Assistant Examiner* — Minh-Chau Pham
(74) *Attorney, Agent, or Firm* — Fishman Stewart PLLC

(57) ABSTRACT

An assembly for an air conditioning system may include an air filter for filtering drawn-in fresh air. The air filter may be arranged in a fresh air path and may separate a raw side from a clean side of the fresh air path. A water path for discharging water separated from the fresh air may be disposed at the raw side of the air filter. The water path may include a water filter for filtering the separated water. The water filter may separate a raw side from a clean side of the water path.

20 Claims, 2 Drawing Sheets

(51) Int. Cl.
   *B60H 3/06* (2006.01)
   *B01D 46/10* (2006.01)
   *B01D 39/14* (2006.01)
   *C02F 1/00* (2006.01)
   *C02F 1/28* (2006.01)

(52) U.S. Cl.
   CPC ............ *B01D 46/10* (2013.01); *B60H 3/0608* (2013.01); *B01D 39/14* (2013.01); *C02F 1/001* (2013.01); *C02F 1/283* (2013.01); *C02F 2303/02* (2013.01)

(56) References Cited

U.S. PATENT DOCUMENTS

| | | | | |
|---|---|---|---|---|
| 6,010,558 A | * | 1/2000 | Ackland | B01D 46/30 55/515 |
| 6,302,932 B1 | * | 10/2001 | Unger | B01D 19/0031 210/315 |
| 6,755,396 B1 | * | 6/2004 | Weinrich | B60H 3/022 261/30 |
| 2002/0014331 A1 | * | 2/2002 | Bendell | B60H 1/00028 165/203 |
| 2005/0229619 A1 | * | 10/2005 | Monnier | B60H 1/3233 62/285 |
| 2008/0078190 A1 | * | 4/2008 | Thomas | F24F 13/222 62/91 |
| 2010/0281896 A1 | * | 11/2010 | Al Watban | F24F 5/0035 62/160 |
| 2013/0025462 A1 | * | 1/2013 | Yun | B01D 45/14 96/256 |
| 2013/0160648 A1 | * | 6/2013 | Spryshak | B60H 3/0641 95/268 |
| 2013/0160649 A1 | * | 6/2013 | Spryshak | B01D 45/02 95/272 |
| 2015/0013372 A1 | * | 1/2015 | Harke | B60H 1/28 62/291 |
| 2015/0151606 A1 | * | 6/2015 | Harke | B60H 1/00321 55/434.2 |
| 2016/0040895 A1 | * | 2/2016 | Wong | F24F 3/06 165/218 |
| 2016/0138816 A1 | * | 5/2016 | Flaxer | F24F 6/02 236/44 R |
| 2016/0221419 A1 | * | 8/2016 | Cianelli | B60H 1/28 |

FOREIGN PATENT DOCUMENTS

| | | |
|---|---|---|
| EP | 1790511 A2 | 5/2007 |
| FR | 2890574 A1 | 3/2007 |
| JP | H11170841 | 6/1999 |

OTHER PUBLICATIONS

English Abstract for DE102010005960A1.
English Abstract for FR2890574A1.
English Abstract for JPH11170841A-A.
DE Search Report for German Patent App. No. 102015200851.7.

* cited by examiner

ASSEMBLY FOR AN AIR CONDITIONING SYSTEM

CROSS-REFERENCE TO RELATED APPLICATIONS

This application claims priority to German Patent Application No. 10 2014 202 368.8, filed Feb. 10, 2014, the contents of which are hereby incorporated by reference in their entirety.

TECHNICAL FIELD

The present invention relates to an assembly for an air conditioning system for air conditioning an interior of a vehicle. The present invention further relates to an air conditioning system equipped with such an assembly. The present invention relates furthermore to an air filter for such an assembly or respectively for such an air conditioning system.

BACKGROUND

Usually, an air conditioning system comprises a fresh air inlet for drawing in fresh air from an environment of the vehicle. In addition, an air conditioning system is usually equipped with an air filter for filtering drawn-in fresh air, which is arranged in a fresh air path and separates therein a raw side from a clean side. On the raw side of the air filter, a deposition of water can occur, which may be contained in the fresh air, e.g. rain water or condensate. A water path conveys the separated water away. In addition, a water box can be optionally provided for collecting and conveying away water separated from the fresh air which, with respect to a fresh air flow occurring in the operation of the air conditioning system, is arranged upstream of the air filter, i.e. in the raw side of the fresh air path.

Such a water box forms a type of drainage, by means of which water which is carried in the fresh air can be discharged. The arrangement of such a drainage upstream of the air filter leads to a reduced stress of the air filter by water, which improves the service life of the air filter.

In addition, in such an air conditioning system it can be expedient to discharge the water, which is separated by means of such a drainage arrangement, together with condensation water which may occur within the air conditioning system. In an air conditioning system, condensation water can occur especially when a cooling device is arranged within the fresh air path, by means of which the drawn-in fresh air is cooled. Frequently here, the dew point of water is fallen below, whereby entrained water condenses and accumulates as liquid condensate. Such a cooling below the dew point of water is frequently desired within the air conditioning system, in order to bring about, alongside an efficient cooling of the fresh air, a drying of the fresh air at the same time.

A problem in the feeding of the drainage water to the condensate is the fact that the drainage water occurs on the raw side, whereas the condensate occurs on the clean side, so that impurities which are entrained in the drainage water can also contaminate a path serving for the discharging of the drainage water and of the condensation water. Furthermore, a drainage path leading the drainage water from the raw side to the clean side forms a bypass for bypassing the air filter, if no or only a little drainage water occurs, so that unpurified fresh air arrives at the clean side of the fresh air path via the drainage path. Hereby, the efficiency of the air filtration is reduced.

SUMMARY

The present invention is concerned with the problem of indicating for an air conditioning system of the type named in the introduction a way for an improved embodiment, which is distinguished in particular by an improved cleaning effect for drawn-in fresh air.

This problem is solved according to the invention by the subject matter of the independent claim. Advantageous embodiments are the subject matter of the dependent claims.

The invention is based on the general idea of providing an assembly for the air conditioning system, in which a water filter is to be arranged in the water path, which separates a raw side from a clean side in the water path. The water filter serves here for filtering the separated water. Through the water filter on the one hand impurities which are situated in the separated water are filtered out, so that only purified drainage water arrives at the clean side of the water path. The risk of a contamination of the water path is thereby reduced. This also applies to the case in which the drainage water is fed on the clean side of the water path and condensation water on the clean side of the fresh air path, so that also a condensation water path or respectively a shared discharge path is protected from impurities. On the other hand, the water filter forms a flow resistance for fresh air, whereby the risk of a bypass flow which bypasses the air filter is reduced. Even if a bypass flow bypassing the air filter were to occur along the water path, for example, in the case of a lack of drainage water, the bypass flow must flow through the water filter, whereby also the bypass stream is subjected to a filtration which filters out impurities from the bypass stream. The assembly which is presented here contains here a section of the fresh air path in which the air filter is arranged, if applicable with corresponding air filter holding means for fixing the air filter within the assembly. Furthermore, the assembly which is presented here contains at least one section of the water path in which the water filter is arranged, if applicable with corresponding water filter holding means for fixing the water filter within the assembly.

Advantageously, the assembly provided for the air conditioning system can have in the water path a water box for collecting and discharging the separated water. The water box is advantageously arranged here at or in the raw side of the fresh air path. In the water box, therefore, the accumulating water can be collected particularly simply and discharged via the remaining water path.

A further development is now particularly advantageous, in which the water filter is arranged in the water box. A comparatively large amount of installation space is available in the water box for accommodating the water filter, so that a relatively large purification capacity is able to be realized, without the risk arising of a blockage of the water path.

According to an advantageous embodiment, the water box can be arranged at a lower end of the air filter and can have an upwardly open water inlet opening. The terms "down" and "up" refer here to a normal installation situation of the air conditioning system in a vehicle, the wheels of which are placed normally on a roadway. "Upward" is therefore facing away from the roadway, whereas "downward" is facing the roadway. The upwardly open water box at the lower end of the air filter leads to water, which is entrained in the raw-side fresh air stream, entering due to gravity downward into the water box. Furthermore, a compact structural form is thereby achieved, because the water box is situated directly at the air filter. In particular, it is conceivable to configure the air filter so that it is indeed permeable for fresh air, but not for entrained water, so that the air filter has a water-separating effect. The water which is separated at the air filter flows off, due to gravity, downward at the air filter in the direction of the water box. It is likewise conceivable to provide a drainage arrangement immediately upstream of the air filter, which separates water entrained in the fresh air stream and feeds it directly to the water box. For example, a drainage structure is conceivable, which is opaque in the main flow direction of the drawn-in fresh air, so that multiple flow deflections are necessary, in order to flow through the drainage structure. The light fresh air can follow these flow deflections readily and without a major drop in pressure, whereas the entrained heavier impurities, in particular water drops, cannot follow these deflections owing the centrifugal forces and instead strike onto impact walls, which in particular form channels and can lead to the water box.

According to an expedient further development, the air filter can have a filter body of a filter material and at least one end plate arranged laterally on the filter body. Hereby, the production of the air filter is simplified. The water box can now be formed integrally on such an end plate of the air filter. Accordingly, in this embodiment, the water box forms an integral component of the air filter. The integral construction type leads to an advantage with regard to assembly. Furthermore, an additional seal between the water box and the air filter can be dispensed with, because the water box can be readily integrated so that the necessary seal exists between water box and filter body.

According to another embodiment, the water filter can have a filling of a filter material, wherein the filling is either filled directly into the water box or into a bag which is inserted into the water box. The bag itself consists of a material which is permeable for water and for the usual impurities, in particular a woven fabric. Such a filling has a particularly high dirt retention capacity, wherein at the same time it only produces a comparatively small drop in pressure. Alternatively, the water filter can also have a shaped non-woven material or a filter foam as filter material, wherein the non-woven material or respectively the foam is inserted into the water box.

According to another embodiment, the water filter can have a cover of non-woven material, which covers a water inlet opening of the water box. Hereby, on the one hand it is brought about that any fluid, i.e. in particular separated water and fresh air, is filtered before it arrives into the water box. On the other hand, the cover of non-woven material brings about a closure of the water inlet opening, which holds back a filling which is filled, if applicable, into the water box.

According to another embodiment, the water box can be elongated and can have a water outlet opening at one longitudinal end, through which filtered water can exit. It has been found that by means of such a lateral or face-side water outlet opening a particularly compact type of construction is able to be realized.

According to a further development, the water box can have a base which has a slope in the direction of the water outlet opening. Through the slope, a sump formation in the water box can be avoided. Bacteria and other microorganisms could proliferate in a sump through standing water, which is basically undesirable.

According to another embodiment, the air filter and the water filter can be arranged so that a filter material of the air filter and a filter material of the water filter do not touch each other. By avoiding a direct contact of the filter materials of air filter and water filter, capillary effects can also be avoided, which could cause the filter material of the air filter to become soaked with water from the water filter.

In another embodiment, the assembly formed from the air filter and the water filter can form an installation unit which can be arranged exchangeably on a housing of the air conditioning system. Hereby, a particularly simple installation or respectively maintenance is produced, including exchange of the entire assembly or respectively installation unit, for the air conditioning system, because the said components are already in a predetermined relative position to one another within the installation unit. Furthermore, the sealing of the individual components with respect to one another is simplified. Moreover, the case of maintenance is simplified in which the air filter and the water filter are exchanged. In so far as such an installation unit is present, the complete installation unit can be exchanged particularly simply. Preferably, the installation unit also comprises the water box.

According to another embodiment, the filter material of the air filter can have an adsorption means, for example in order to filter out odorants from the air stream. In another advantageous embodiment, the filter material of the water filter can have an adsorption means, for example in order to filter out odorants from the separated water. It is noteworthy here that the odour-absorbing water filter also acts in an odour-adsorbing manner for the air flow, because the odorants, due to their molecular movements, can also strike onto the water filter and can be absorbed there by the adsorption means. Activated carbon and suchlike come into consideration as adsorption means both for the air filter and also for the water filter.

In an alternative embodiment, the water filter can also be arranged in the water path downstream of the water box, in so far as sufficient installation space is available there. In particular, the water filter can then also be arranged in a feed line which leads away from the water box and feeds the separated, purified water to a condensate discharge, which discharges condensate of a condenser or air cooler which is present if applicable.

An air conditioning system according to the invention is equipped with at least one assembly of the type described above. Here, the air conditioning system provides a fresh air duct into which the assembly is incorporated and in particular can be installed as an assembly unit. In the fresh air duct, the fresh air path is directed to the assembly and conveyed away therefrom.

In an advantageous embodiment of the air conditioning system, an air cooler can be arranged in the air path downstream of the air filter, by means of which air cooler the drawn-in fresh air can be cooled. This air cooler can have a condensate discharge, by means of which condensate occurring during the cooling of the fresh air can be discharged. A further embodiment of the air conditioning system is now particularly expedient, in which the clean side of the water path is connected fluidically to the condensate discharge. Consequently, in addition to the condensate, drainage water can also be discharged via the condensate discharge. Through the water filter in the water path, a contamination of the condensate discharge is thereby avoided.

An air filter according to the invention is distinguished by a filter body of a filter material, which has laterally at least one end plate, wherein on such an end plate a water box is integrally formed for collecting and discharging water separated from the fresh air. Through this type of construction, the air filter forms an assembly or unit having a high functional density, which simplifies the installation of the air conditioning system or respectively the maintenance.

Further important features and advantages of the invention will emerge from the subclaims, from the drawings and from the associated figure description with the aid of the drawings.

It shall be understood that the features mentioned above and to be further explained below are able to be used not only in the respectively indicated combination, but also in other combinations or in isolation, without departing from the scope of the present invention.

Preferred example embodiments of the invention are illustrated in the drawings and are explained in further detail in the following description, wherein the same reference numbers refer to identical or similar or functionally identical components.

BRIEF DESCRIPTION OF THE DRAWINGS

There are shown, respectively diagrammatically.

DETAILED DESCRIPTION

Figure 1:
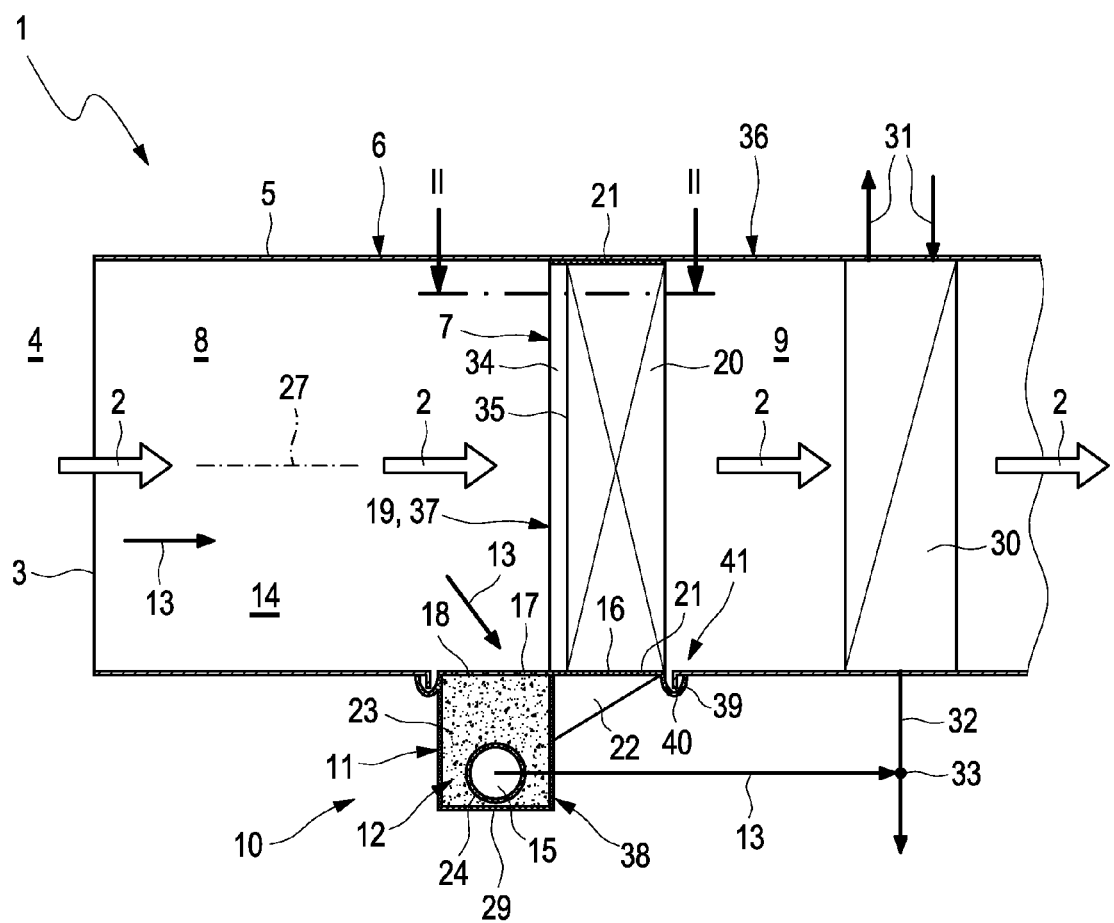
FIG. 1 a greatly simplified longitudinal section of an air conditioning system in the region of an air filter, FIG. 2 a top view of the air conditioning system in the region of the air filter according to a viewing direction II in FIG. 1.
Figure 2:
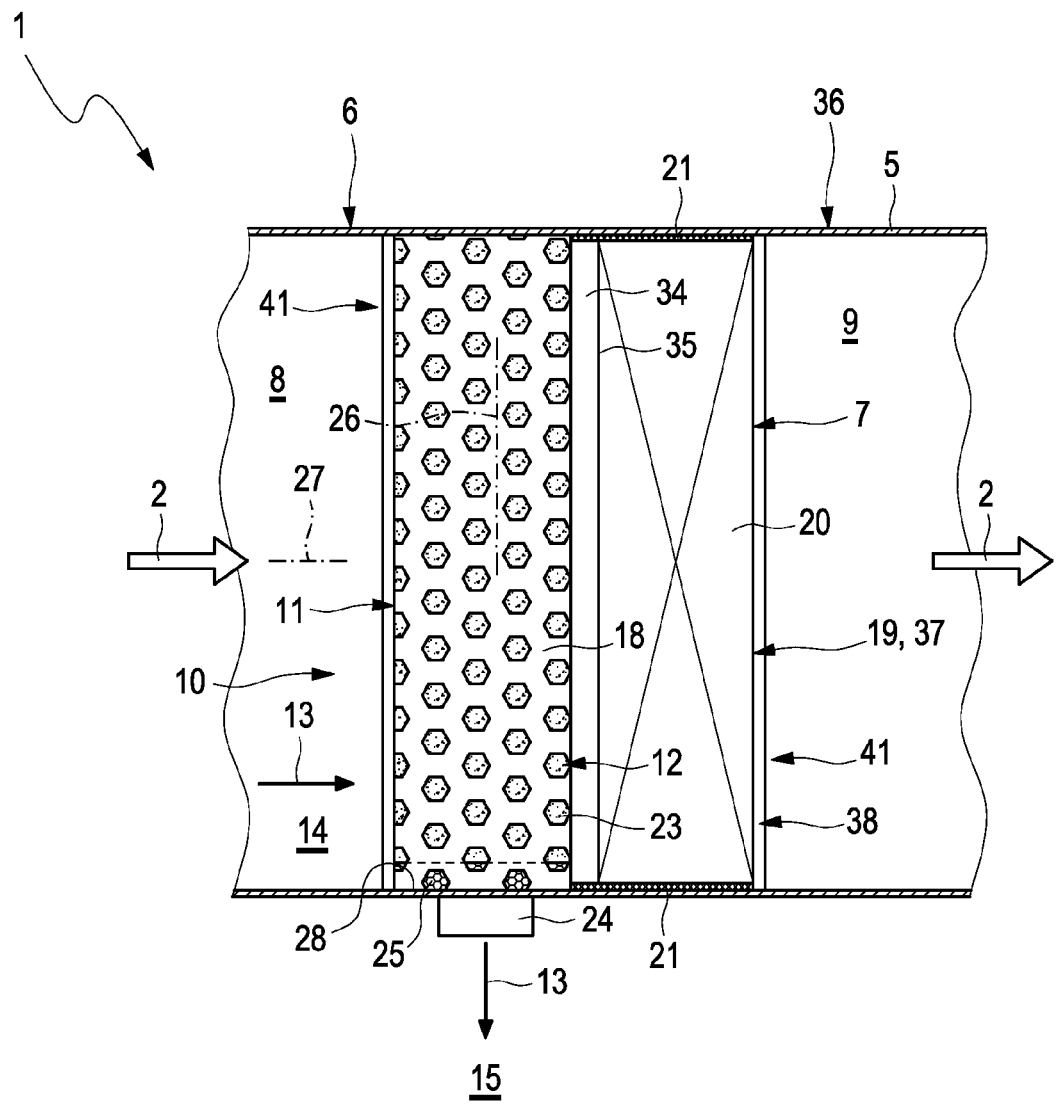

According to FIGS. 1 and 2, an air conditioning system 1, by means of which an interior of a vehicle, not shown here, can be air-conditioned, comprises a fresh air path 2, indicated by arrows, which connects a fresh air inlet 3 on the inlet side with at least one fresh air outlet, not shown here, which opens into said vehicle interior. The fresh air inlet 3 is open to an environment 4 of the vehicle, so that the fresh air can be drawn in from the environment 4 and conveyed along the fresh air path 2. The fresh air path 2 can be delimited laterally here in a conventional manner by walls 5, which form for example a fresh air duct 6. The air conditioning system 1 comprises an air filter 7, through which the fresh air path 2 is directed. The air filter 7 is arranged here in the fresh air path 2 so that it separates a raw side 8 from a clean side 9 in the fresh air path 2. With respect to a fresh air flow, following the fresh air path 2, which occurs in operation of the air conditioning system 1, the raw side 8 is situated upstream of the air filter 7, whereas the clean side 9 is then arranged downstream of the air filter 7.

The air conditioning system 1 is equipped in addition with a drainage arrangement 10, by means of which water entrained in the drawn-in fresh air can be separated. The drainage arrangement 10 comprises here a water box 11 for collecting and discharging water which is separated from the fresh air. The water box 11 is arranged here on the raw side 8 of the fresh air path 2, i.e. upstream of the air filter 7 with respect to the fresh air flow. In the preferred embodiment which is shown here, a water filter 12 is arranged in the water box 11, by means of which the separated water can be filtered. The water filter 12 is arranged here in a water path 13, which is indicated by arrows in FIGS. 1 and 2. Here, in the water path 13, the water filter 12 separates a raw side 14 from a clean side 15 of the water path 13.

Irrespective of whether the water filter 12 is arranged in the water box 11, and irrespective of whether a water box 11 is provided at all, the air filter 7 and the water filter 12 form components of an assembly 37 within the air conditioning system 1. This assembly 37 therefore comprises a section of the fresh air path 2, in which the air filter 7 is arranged, and at least one section of the water path 13, in which the water filter 12 is arranged. Preferably, however, the water box 11 also belongs to the assembly 37, especially when the water filter 12 is arranged in the water box 11.

According to the embodiment which is shown here, the water box 11 is arranged at a lower end 16 of the air filter 7. In addition, the water box 11 has an upwardly open water inlet opening 17, which is covered in FIG. 1 by a cover of non-woven material 18. In the example, provision is further made that the water box 11 and the air filter 7 form a cohesive installation unit 19, which can be incorporated as a whole into the fresh air system 1 or respectively can be exchanged for maintenance purposes. The fresh air duct 6 forms here a component of a housing 36 of the air conditioning system 1, in which the air filter 7 and the water filter 12 or respectively the entire assembly 37 or respectively the installation unit 19 is exchangeably incorporated. The assembly 37, configured as installation unit 19, can then be offered as an initial equipment part or as a service part and installed in the air conditioning system 1.

The assembly 37, configured as installation unit 19, can expediently have a support structure 38, which can optionally have air filter holding means, not shown here or respectively not necessary, for fixing the air filter 7 on the support structure 38 and/or water filter holding means, not shown here or respectively not necessary, for fixing the water filter 12 on the support structure 38. In the example, the water box 11 is formed integrally on the support structure 38. Likewise, the support structure 38 has fastening means 39 here for fixing the installation unit 19 on a housing 36 of the air-conditioning system 1. Counter-fastening means 40, complementary to the fastening means 39, are formed on the housing 36, which counter-fastening means are suitable in particular for realizing a quick fastening. In the example, the fastening means 39 and the counter-fastening means 40 form a groove-and-tongue connection 41, which is distinguished by sufficient tightness, high mechanical strength and being able to be realized in a simple manner. As illustrated, the air filter 7 can be mounted on the support structure 38.

The air filter 7 can have, for example, a filter body 20 which consists of filter material and is flowed through by the fresh air flow in the operation of the air conditioning system 1. The filter body 20 can be enclosed here laterally by end plates 21. These can be produced for example from a plastic. According to FIG. 1, the water box 11 or respectively the previously mentioned support structure 38 can be formed integrally with a (lower) end plate 21 provided at the lower end 16. The water box 11 is thereby formed in one material with this lower end plate 21. In so far as more than one end plate 21 is provided, two or more end plates can be produced in one material, i.e. from one piece. In so far as four end plates 21 are provided, these can form a completely circumferential frame, laterally enclosing the filter body 20. In FIG. 1 in addition a reinforcing rib 22 is indicated, which increases the rigidity of the connection between water box 11 and lower end plate 21. In so far as the installation unit 19 is present, the water box 11, the end plates 21, the said frame and the reinforcing ribs 22 which are present if applicable, are respectively a component of the installation group 37 and in particular formed on the support structure 38, preferably by an integral forming in one material.

Expediently, the water filter 12 can be formed by a filling 23 of a filter material, wherein the filling 23 can be filled directly into the water box 11. However, an embodiment is preferred in which the filling 23 itself is filled into a bag, not illustrated here, of a material which is permeable for the water, which bag is inserted into the water box 11. Hereby, it can be prevented in particular that the filling 23 is flushed out from a water outlet opening 24 of the water box 11. It is likewise conceivable to arrange specifically only at the water outlet opening 24 a retention element 25 which is permeable for water but is impermeable for the filter material, which retention element is indicated in FIG. 2 and can be formed for example by a woven fabric or a non-woven material.

As can be seen from FIGS. 1 and 2, the water box 11 is equipped with an elongated geometry, so that a box longitudinal direction 26 runs transversely to a duct longitudinal direction 27 and substantially horizontally. In addition, a box length measured parallel to the box longitudinal direction 26 is greater than a box width measured parallel to the duct longitudinal direction 27 and a box height measured vertically. The water outlet opening 24 is arranged here at a face-side longitudinal end 28 of the water box 11. The filtered drainage water exits through the water outlet opening 24. According to FIG. 1, the water box 11 has on its underside a base 29. The base 29 has a slope, not noticeable here, in the direction of the water outlet opening 24, so that the base 29 drops towards the water outlet opening 24. In other words, the previously mentioned box height decreases with an increasing distance from the water outlet opening 24. The base 29 is also inclined here with respect to a horizontal plane, so that gravity drives the water along the base 29 in the direction of the water outlet opening 24.

Expediently, the air filter 7 and the water filter 12 are arranged within the previously mentioned installation unit 19 so that the filter material, of which the filter body 20 consists, and the filter material of the water filter 12, which can be formed for example by the previously mentioned filling 23, to not touch each other. The filter material of the air filter 7 can have here an adsorption means. Additionally or alternatively, the filter material of the water filter 12 can have an adsorption means. An activated carbon granulate comes into consideration here, for example, as adsorption means. In the case of the water filter 12, such an activated carbon granulate can be mixed into the remaining filling 23 of the filter material. Likewise, it is basically possible to form the said filling 23 exclusively from such adsorption means.

According to FIG. 1, the air conditioning system 1 can have an air cooler 30 in the fresh air path 2 downstream of the air filter 7, by means of which the drawn-in fresh air can be cooled. For this, the air cooler 30 can be connected for example to a suitable cooling circuit 31. The air cooler 30 is equipped with a condensate discharge 32, by means of which condensate, if applicable occurring in the air cooler 30, can be discharged from the air cooler 30 and out from the fresh air duct 6. Expediently, the clean side 15 of the water path 13 is now connected fluidically to this condensate discharge 32. A corresponding connection site is designated by 33 in FIG. 1. As the drainage water is purified by means of the water filter 12, the condensate discharge 32 can be used particularly favourably for the discharging of the drainage water, without the risk of a contamination of the condensate discharge 32 being increased here.

According to an advantageous embodiment, the drainage arrangement 10 can have a drainage structure 34 arranged in the fresh air duct 6, which drainage structure must be flowed through by the fresh air flow, wherein the water, entrained in liquid form, can be separated. This is achieved expediently by means of inertial separation. Such an inertial separation can be achieved for example in that the fresh air flow is deflected several times within the drainage structure 34, such that the fresh air can readily follow the deflections, whilst entrained particles, in particular water droplets, cannot follow these flow deflections owing to their great mass, but rather strike onto impact surfaces of the drainage structure 34 which are provided specifically for this. The impact surfaces can be formed by pipes which are open on one side, which then discharge the drainage water accumulating therein to the water box 11. In the example of FIG. 1 such a drainage structure 34 is arranged at an inlet side 35 of the filter body 20 which is flowed against by the fresh air flow during operation. In particular, the drainage structure 34 can be integrated into the air filter 7 or respectively into the previously mentioned installation unit 19.

The invention claimed is:

1. An assembly for an air conditioning system, comprising:
    an air filter for filtering drawn-in fresh air, the air filter arranged in a fresh air path and separates a raw side from a clean side of the fresh air path,
    a water path for discharging water separated from the fresh air disposed at the raw side of the air filter,
    wherein the water path includes a water filter for filtering the separated water, the water filter separating a raw side from a clean side of the water path.

2. The assembly according to claim 1, wherein the water path includes a water box for collecting and discharging the separated water, wherein the water box is arranged at least one of at the raw side of the fresh air path and in the raw side of the fresh air path.

3. The assembly according to claim 2, wherein the water filter is arranged in the water box.

4. The assembly according to claim 2, wherein the water box is arranged at a lower lateral end of the air filter and has a water inlet opening open upwardly in a direction of the air filter.

5. The assembly according to claim 4, wherein the air filter includes a filter body composed of a filter material and has at least one end plate arranged laterally on the filter body, wherein the water box is formed integrally on the at least one end plate of the air filter.

6. The assembly according to claim 3, wherein the water filter includes a filling of a filter material, wherein the filling is at least one of filled directly into the water box, filled into a bag arranged in the water box and introduced into the water box as at least one of a shaped non-woven material and a filter foam.

7. The assembly according to claim 3, wherein the water filter includes a non-woven material cover, which covers a water inlet opening of the water box.

8. The assembly according to claim 3, wherein:
    the water box is elongated and has at a longitudinal end a water outlet opening for discharging filtered water, and
    the water box has a base defining a sloped profile sloping in a direction of the water outlet opening.

9. The assembly according to claim 3, wherein the air filter and the water filter are arranged such that a filter material of the air filter and a filter material of the water filter do not touch each other.

10. The assembly according to claim 3, wherein the air filter and the water filter form an exchangeable installation unit for removably arranging on a housing.

11. The assembly according to claim 3, wherein at least one of:
    the air filter has a filter material including an adsorption element, and
    the water filter has a filter material including an adsorption element.

12. The assembly according to claim 2, wherein the water filter is arranged in the water path downstream of the water box.

13. An air conditioning system for a vehicle, comprising:
a fresh air path for directing a fresh air stream,
a drainage arrangement for separating water entrained in the fresh air stream, the drainage arrangement including a water path for discharging the water from the fresh air path, and
an assembly including an air filter for filtering the fresh air stream and a water filter for filtering the separated water, wherein the air filter is arranged in the fresh air path and separates a raw side from a clean side in the fresh air path, and the water filter is arranged in the water path and separates a raw side from a clean side in the water path.

14. The air conditioning system according to claim 13, further comprising an air cooler arranged downstream the air filter in the fresh air path for cooling the fresh air stream, wherein the air cooler includes a condensate discharge fluidically connected to the clean side of the water path.

15. The air conditioning system according to claim 13, wherein the air filter includes a water box arranged at the raw side of the fresh air path and in fluid communication with the water path.

16. The air conditioning system according to claim 15, wherein the water filter is arranged in the water box.

17. The air conditioning system according to claim 16, wherein the water filter includes a non-woven material cover which covers a water inlet opening of the water box.

18. The air conditioning system according to claim 17, wherein the water box includes a base opposite the water inlet opening and a longitudinal end having a water outlet opening for discharging the separated water, wherein the base defines a profile sloping in a direction of the water outlet opening.

19. The air conditioning system according to claim 13, wherein at least one of:
the air filter includes a filter material having an adsorption element; and
the water filter includes a filter material including an adsorption element.

20. An assembly for an air conditioning system of a vehicle, comprising:
an air filter for filtering a fresh air stream, the air filter arranged in a fresh air path and separates a raw side of the fresh air path from a clean side;
a water path for discharging separated water from the fresh air steam disposed at the raw side of the air filter;
a water box in communication with the water path and disposed at the raw side of the fresh air path;
a water filter arranged in the water box and separating a raw side of the water path from a clean side, the water filter including a non-woven material cover; wherein the water box is arranged at a lower lateral end of the air filter and has an inlet opening for receiving the separated water, the water box including a base opposite the water inlet opening and a longitudinal end having a water outlet opening for discharging the separated water, wherein the base defines a profile sloping in a direction of the water outlet opening; and
wherein the non-woven material cover of the water filter covers the water inlet opening.

\* \* \* \* \*